US010006413B2

(12) United States Patent
Dudar et al.

(10) Patent No.: US 10,006,413 B2
(45) Date of Patent: Jun. 26, 2018

(54) SYSTEMS AND METHODS FOR DETECTION AND MITIGATION OF LIQUID FUEL CARRYOVER IN AN EVAPORATIVE EMISSIONS SYSTEM

(71) Applicant: Ford Global Technologies, LLC, Dearborn, MI (US)

(72) Inventors: Aed M. Dudar, Canton, MI (US); Dennis Seung-Man Yang, Canton, MI (US); Robert Ognjanovski, Jr., Shelby Township, MI (US); Russell Randall Pearce, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 14/795,558

(22) Filed: Jul. 9, 2015

(65) Prior Publication Data

US 2017/0008390 A1 Jan. 12, 2017

(51) Int. Cl.
*F02M 25/08* (2006.01)
*F02D 41/00* (2006.01)
*B60K 15/03* (2006.01)

(52) U.S. Cl.
CPC ....... *F02M 25/0872* (2013.01); *F02D 41/003* (2013.01); *F02M 25/0818* (2013.01);
(Continued)

(58) Field of Classification Search
CPC .... B60K 15/03006; B60K 2015/03256; B60K 2015/03217; B60K 2015/0321;
(Continued)

(56) References Cited

U.S. PATENT DOCUMENTS 3,687,335 A * 8/1972 Hunter ............. B60K 15/03504
123/518
3,888,223 A * 6/1975 Mondt ..................... F02M 1/16
123/519

(Continued)

FOREIGN PATENT DOCUMENTS

CA 2060103 7/1999

OTHER PUBLICATIONS

Dudar, Aed M., "System and Methods for Purging Residual Exhaust and Uncombusted Fuel to an Exhaust Catalyst," U.S. Appl. No. 14/701,094, filed Apr. 30, 2015, 52 pages.
(Continued)

*Primary Examiner* — Sizo Vilakazi
*Assistant Examiner* — Brian Kirby
(74) *Attorney, Agent, or Firm* — Julia Voutyras; McCoy Russell LLP

(57) ABSTRACT

Methods and systems are provided for detecting and mitigating the presence of liquid fuel carryover in an evap system of a vehicle in response to a refueling event. In one example, during a first condition, a vacuum pump is activated to pressurize the fuel system responsive to a first fuel tank pressure decay rate being less than a threshold, and responsive to a second fuel tank pressure decay rate being greater than a threshold, the vacuum pump is maintained on until a fuel tank pressure decreases to atmospheric pressure. In this way, liquid fuel carryover can be quickly and accurately diagnosed, such that mitigating actions may be taken to ensure liquid fuel is returned to the tank prior to contacting the adsorbent material within the vapor canister.

19 Claims, 4 Drawing Sheets

(52) U.S. Cl.
CPC .................. *B60K 15/03006* (2013.01);
*B60K 2015/0319* (2013.01); *B60K 2015/03019*
(2013.01); *B60K 2015/0321* (2013.01); *B60K 2015/03217* (2013.01); *B60K 2015/03243*
(2013.01); *B60K 2015/03256* (2013.01); *B60K 2015/03328* (2013.01)

(58) Field of Classification Search
CPC .. B60K 2015/0319; B60K 2015/03328; B60K 2015/03019; B60K 2015/03243; B60K 2015/03197; B60K 2015/03203; B60K 2015/03368; B60K 2015/03561; B60K 2015/03576; B60K 2015/03566; F02D 41/003; F02M 25/0872; F02M 25/0818
USPC ........................ 123/198 D, 518–520, 461
See application file for complete search history.

(56) References Cited

U.S. PATENT DOCUMENTS

| | | | | |
|---|---|---|---|---|
| 4,072,934 A * | 2/1978 | Hiller | B67D 7/0488 | 141/290 |
| 4,827,987 A * | 5/1989 | Faeth | B67D 7/0488 | 141/44 |
| 4,829,968 A * | 5/1989 | Onufer | B60K 15/03504 | 123/518 |
| 5,056,493 A * | 10/1991 | Holzer | B60K 15/00 | 123/516 |
| 5,143,035 A * | 9/1992 | Kayanuma | F02M 25/08 | 123/198 D |
| 5,297,529 A * | 3/1994 | Cook | F02M 25/0818 | 123/198 D |
| 5,375,633 A | 12/1994 | Bucci | | |
| 5,400,759 A * | 3/1995 | Ishida | F02M 25/0809 | 123/198 D |
| 5,411,004 A * | 5/1995 | Busato | F02M 25/0818 | 123/198 D |
| 5,463,998 A * | 11/1995 | Denz | F02M 25/0809 | 123/198 D |
| 5,494,021 A * | 2/1996 | Yoneyama | F02M 25/0809 | 123/520 |
| 5,532,673 A | 7/1996 | Olson et al. | | |
| 5,603,349 A * | 2/1997 | Harris | B60K 15/035 | 123/519 |
| 5,687,756 A * | 11/1997 | VanNatta | B60K 15/03519 | 137/202 |
| 5,868,175 A * | 2/1999 | Duff | B67D 7/0486 | 141/192 |
| 5,927,315 A | 7/1999 | Kim | | |
| 6,067,967 A * | 5/2000 | Kidokoro | F02D 33/003 | 123/514 |
| 6,102,085 A * | 8/2000 | Nanaji | B67D 7/0486 | 141/59 |
| 6,131,621 A * | 10/2000 | Garrard | B67D 7/0486 | 141/290 |
| 6,247,458 B1 * | 6/2001 | Heinemann | F02M 25/0818 | 123/516 |
| 6,405,747 B1 | 6/2002 | King et al. | | |
| 6,695,895 B2 * | 2/2004 | Hyodo | F02M 25/089 | 123/519 |
| 6,698,402 B2 * | 3/2004 | Biesinger | F02D 41/0035 | 123/179.19 |
| 6,889,729 B2 * | 5/2005 | Bolle | B60K 15/03504 | 123/520 |
| 7,316,224 B2 * | 1/2008 | Chae | F02M 25/0809 | 123/198 D |
| 7,363,803 B2 * | 4/2008 | Hayakawa | F02M 25/0809 | 123/499 |
| 7,441,549 B2 * | 10/2008 | Takayanagi | F02M 25/0818 | 123/520 |
| 7,484,500 B2 * | 2/2009 | Terada | F02M 25/089 | 123/516 |
| 7,568,494 B2 * | 8/2009 | Devall | F16K 24/044 | 137/202 |
| 7,784,449 B2 * | 8/2010 | Maly | F02M 25/0818 | 123/516 |
| 8,155,917 B2 * | 4/2012 | Maegawa | G01F 22/02 | 702/140 |
| 8,191,585 B2 * | 6/2012 | Mellone | G01M 3/2892 | 141/1 |
| 8,273,164 B2 * | 9/2012 | Makino | B01D 53/0415 | 123/519 |
| 8,360,089 B2 | 1/2013 | Hirata | | |
| 2002/0184942 A1 * | 12/2002 | Isobe | F02M 25/0809 | 73/114.41 |
| 2005/0284539 A1 * | 12/2005 | Leonhardt | F16K 24/044 | 141/302 |
| 2006/0231138 A1 * | 10/2006 | Devall | F16K 24/044 | 137/202 |
| 2007/0084274 A1 * | 4/2007 | Takayanagi | F02M 25/0818 | 73/114.39 |
| 2007/0131204 A1 | 6/2007 | Chae | | |
| 2007/0169842 A1 * | 7/2007 | King | B60K 15/03504 | 141/302 |
| 2007/0193648 A1 * | 8/2007 | Grantham | F02M 25/0836 | 141/59 |
| 2009/0056680 A1 * | 3/2009 | Hill | B60K 15/035 | 123/520 |
| 2009/0084363 A1 * | 4/2009 | Reddy | F02M 25/0854 | 123/520 |
| 2011/0166765 A1 * | 7/2011 | DeBastos | B60K 15/03504 | 701/102 |
| 2011/0220226 A1 * | 9/2011 | Devulder | B60K 15/03504 | 137/588 |
| 2013/0139917 A1 * | 6/2013 | McAvey | F02M 37/0088 | 137/596.12 |
| 2013/0306628 A1 * | 11/2013 | Aso | B60K 15/03504 | 220/4.14 |
| 2014/0007849 A1 * | 1/2014 | Nagasaku | F02M 25/089 | 123/519 |
| 2014/0026992 A1 * | 1/2014 | Pearce | B60K 15/035 | 137/561 R |
| 2014/0074385 A1 | 3/2014 | Dudar et al. | | |
| 2014/0102421 A1 * | 4/2014 | Kato | F02M 25/0818 | 123/520 |
| 2014/0107906 A1 * | 4/2014 | Jentz | F02M 37/0088 | 701/102 |
| 2014/0257721 A1 * | 9/2014 | Thompson | G07C 5/00 | 702/51 |
| 2014/0299111 A1 * | 10/2014 | Denz | F02M 35/1038 | 123/521 |
| 2015/0013437 A1 * | 1/2015 | Takakura | F02M 25/0818 | 73/40.5 R |
| 2015/0059870 A1 * | 3/2015 | Iwaya | F02M 37/0076 | 137/351 |
| 2015/0090006 A1 | 4/2015 | Peters et al. | | |

OTHER PUBLICATIONS

Dudar, Aed M., "System and Methods for Purging Residual Exhaust and Uncombusted Fuel to a Fuel Vapor Canister," U.S. Appl. No. 14/810,177, filed Jul. 27, 2015, 48 pages.

Dudar, Aed M., "System and Methods for Preventing Hydrocarbon Breakthrough Emissions," U.S. Appl. No. 14/860,421, filed Sep. 21, 2015, 51 pages.

Dudar, Aed M., "Systems and Methods for Detection and Mitigation of Liquid Fuel Carryover in an Evaporative Emissions System," U.S. Appl. No. 14/939,672, filed Nov. 12, 2015, 54 pages.

* cited by examiner

SYSTEMS AND METHODS FOR DETECTION AND MITIGATION OF LIQUID FUEL CARRYOVER IN AN EVAPORATIVE EMISSIONS SYSTEM

FIELD

The present description relates generally to methods and systems for controlling a vehicle fuel system to prevent liquid fuel from damaging a fuel vapor canister.

BACKGROUND/SUMMARY

Vehicles with an internal combustion engine may be fitted with fuel vapor recovery systems wherein vaporized hydrocarbons (HCs) released from a fuel tank are captured and stored in a fuel vapor canister containing a quantity of fuel-absorbing material such as activated charcoal Eventually, the fuel vapor canister may become filled with an amount of fuel vapor. The fuel canister may be cleared of fuel vapor by way of a purging operation. A fuel vapor purging operation may include opening a purge valve to introduce the fuel vapor into the cylinder(s) of the internal combustion engine for combustion so that fuel economy may be maintained and fuel vapor emissions may be reduced.

Activated charcoal has been found to be a suitable fuel vapor absorbing material to be used in such a canister device because of its extremely porous structure and very large surface area to weight ratio. However, this porous structure can be blocked and lose its efficiency when coated with liquid fuel. This may occur if, for example, during refueling a pump operator adds fuel after an initial automatic shut-off. For instance, in an attempt to maximize the amount of fuel pumped into the tank, a pump operator may dispense additional fuel in what is commonly referred to as "tricklefilling". If liquid has entered the evap recovery lines and a purge cycle is commanded at the next engine start, the liquid can get sucked into the canister and corrupt the activated carbon. This may damage the canister and lead to increased HC emissions. Additionally, if liquid fuel in the canister or purge line is purged to the intake, a loss of engine power may result from an extremely low air-fuel ratio (A/F). Accordingly, it is imperative to easily diagnose and mitigate the presence of liquid fuel in the evap recovery lines.

Toward this end, US Patent Application US 2007/0131204 A1 teaches a method of detecting whether liquefied fuel exists in a canister purge line based on a fuel level in a fuel tank higher than a pre-set level. If the fuel level is greater than a pre-set level, an air ratio is measured by an oxygen sensor in the exhaust manifold. The purge control valve is then opened for a pre-set time period, the air ratio is measured again, and a difference is calculated between the two. If the difference is less than or equal to a first value, and the air-fuel ratio after opening the purge control valve is less than or equal to a second value, then it is deemed that liquefied fuel exists in the canister purge line. If liquefied fuel is deemed to exist in the canister purge line, the purge control valve may be closed for a pre-set time period. Thus, loss of engine power due to a low A/F caused by liquefied fuel in the canister purge line is prevented by detecting liquefied fuel in the canister purge line in advance. However, the inventors herein have recognized potential issues with such a method. For example, the method is such that detection of fuel in the canister purge line does not alleviate or prevent the possibility of vapor canister degradation due to liquid in the vapor canister. Further, the method does not provide mitigating actions to purge liquid fuel from the evap recovery lines. An attractive alternative therefore, is a method that includes both detection and mitigation of fuel carryover in the evap line(s), such that liquid fuel does not come into contact with the activated charcoal housed within the vapor canister.

In one example, the issues described above may be addressed by a method for a vehicle. During a first condition, a vacuum pump is activated to pressurize the fuel system responsive to a first fuel tank pressure decay rate being less than a threshold and, responsive to a second fuel tank pressure decay rate being greater than a threshold, the vacuum pump is maintained on until a fuel tank pressure decreases to atmospheric pressure. In this way, fuel carryover in an evap recovery line may be accurately diagnosed and mitigated, such that canister degradation due to liquid fuel contacting the adsorbent is avoided.

As one example, responsive to the second fuel tank pressure decay rate being less than the threshold, the vacuum pump may be deactivated and a restriction may be indicated in the evaporative emissions system coupled to the fuel system. In this way, pressure build-up due to the vacuum pump is avoided, and mitigating action may be performed to diagnose and remedy the indicated restriction.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
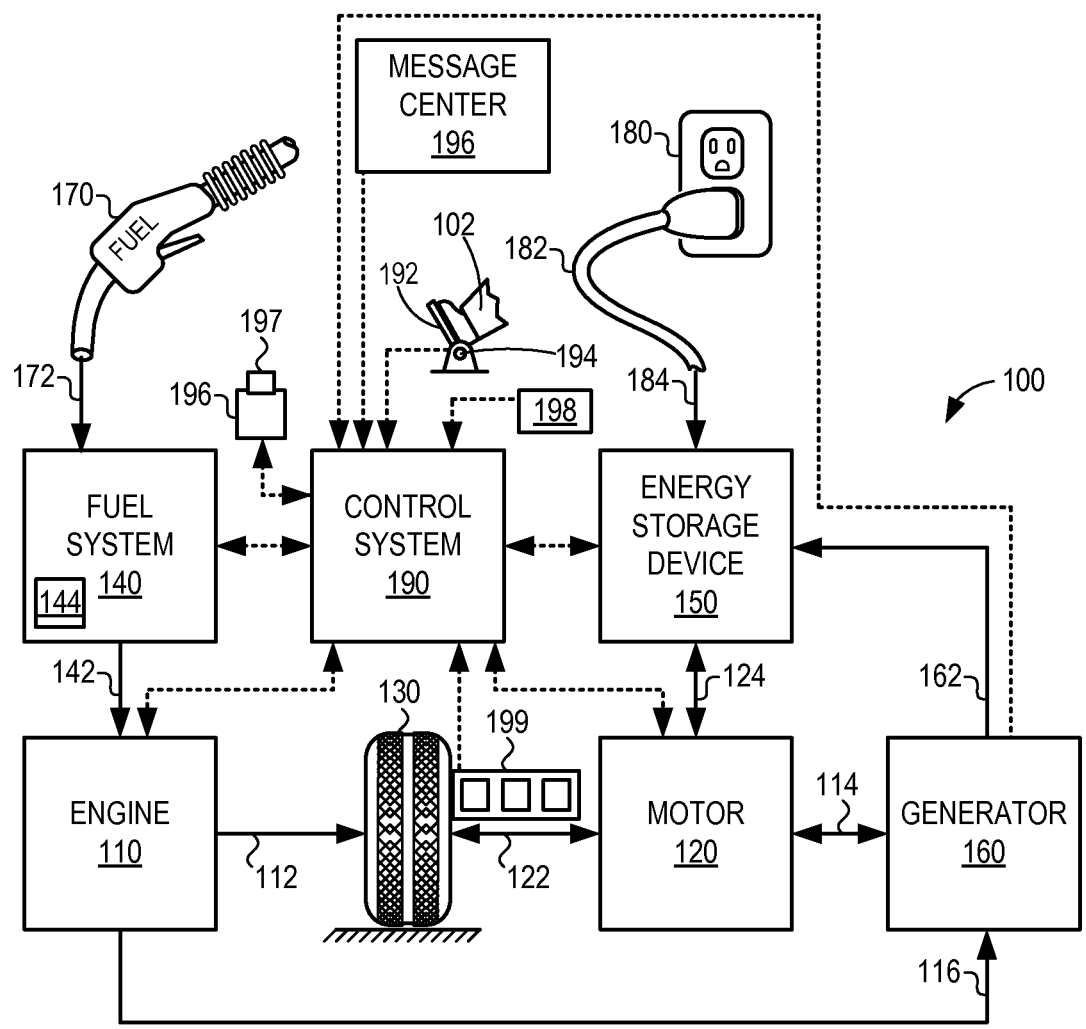
FIG. 1 schematically shows an example vehicle propulsion system.
Figure 2:
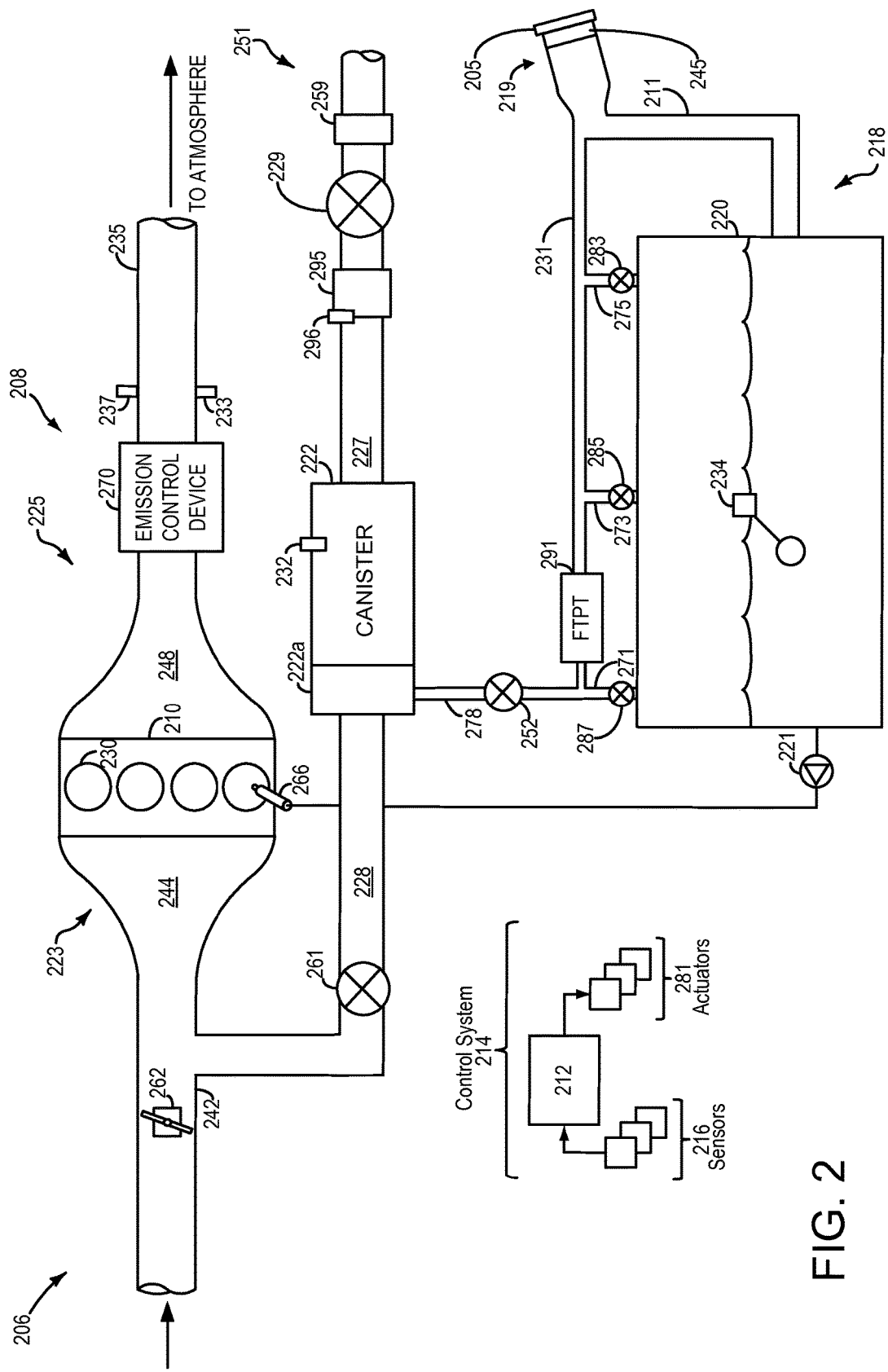
FIG. 2 schematically shows an example vehicle system comprising an engine system coupled to a fuel system and an evaporative emissions system.
Figure 3:
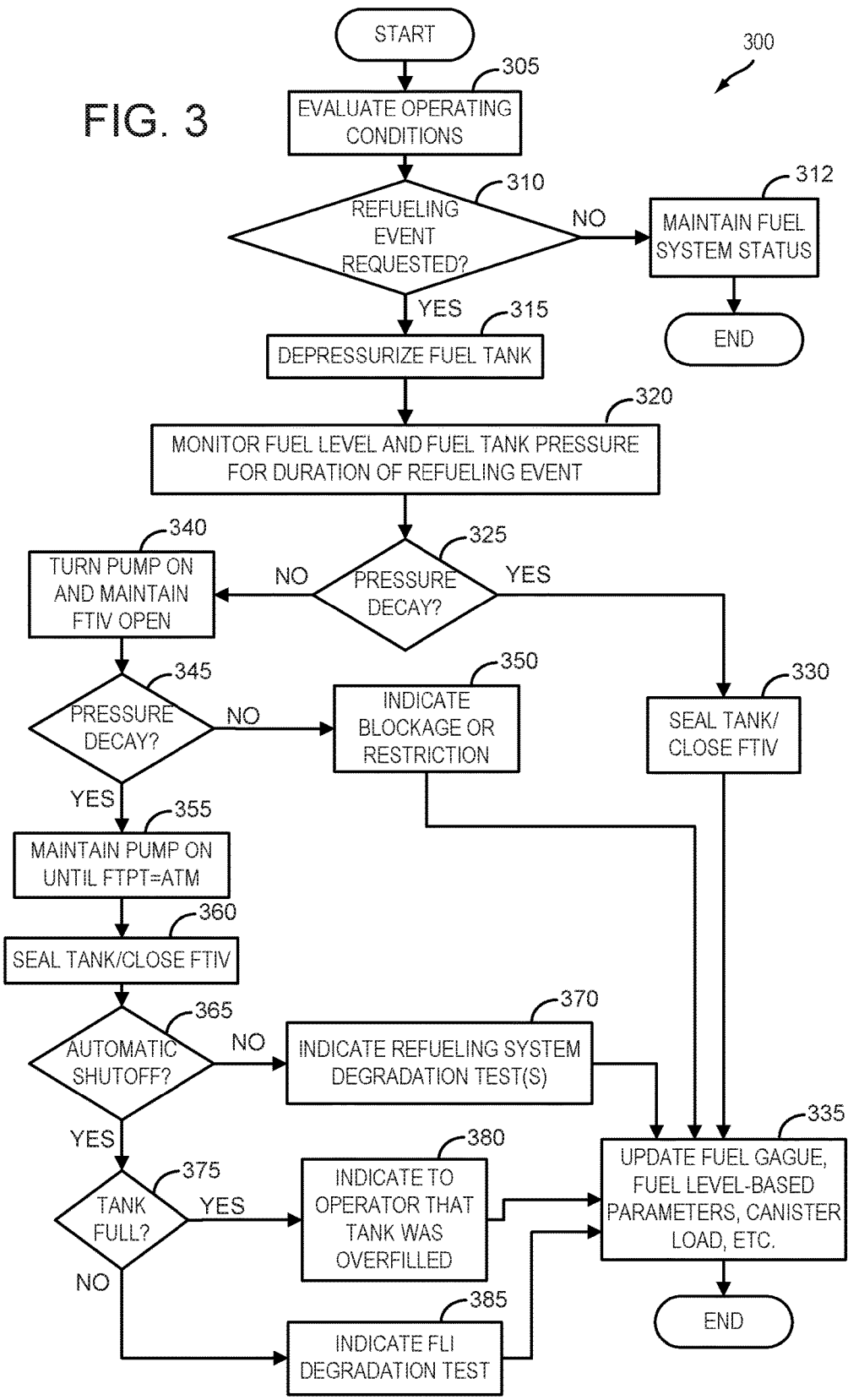
FIG. 3 shows an example method for detecting and mitigating liquid fuel carryover in the evaporative emissions system.
Figure 4:
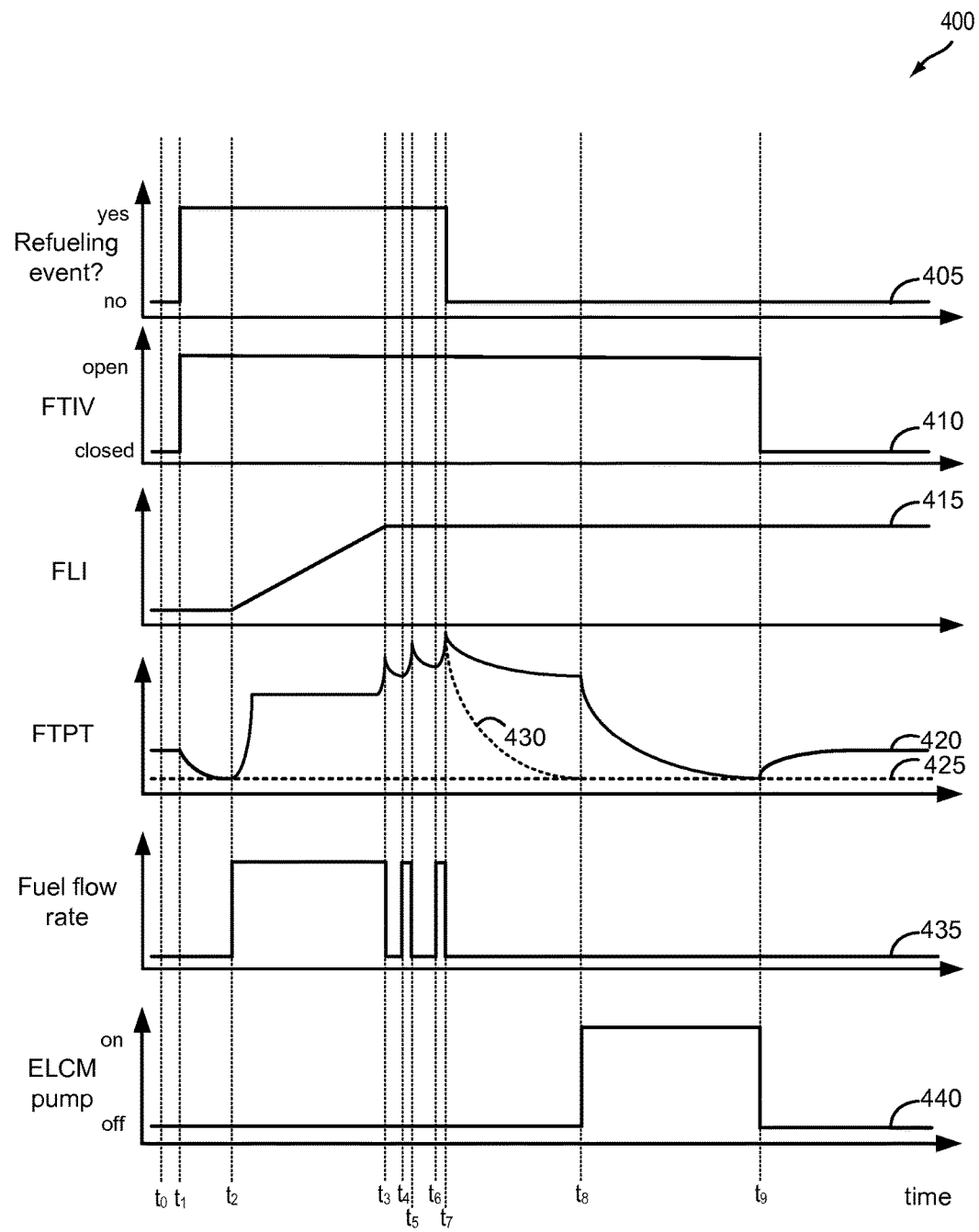
FIG. 4 shows a timeline for an example liquid fuel carryover detection and mitigation procedure.

The following detailed description relates to systems and methods for detecting and mitigating the presence of liquid fuel carryover in fuel vapor recovery (evap recovery) lines occurring while refueling a fuel tank. The fuel tank may be included in a vehicle, such as a hybrid electric vehicle, as shown in FIG. 1. The vehicle may include a fuel system and an evaporative emissions (evap) system, wherein the fuel tank is coupled to a fuel vapor canister via one or more fuel vapor recovery lines as shown in FIG. 2. During a refueling event, overfilling the fuel tank (via trickle filling, or due to a faulty automatic shut-off mechanism) can lead to liquid fuel becoming trapped in the evap recovery lines. If the liquid fuel is not purged from the evap recovery lines prior to a subsequent purge event, the liquid fuel may be drawn into the fuel vapor canister, damaging the adsorbent there within. FIG. 3 depicts an example method for detecting and mitigating the presence of liquid fuel carryover in evap recovery lines. More specifically, the method provided detects the presence of liquid fuel carryover by monitoring fuel tank pressure bleed-down following a refueling event and, if liquid fuel is detected, pressurizing the evap system to return said fuel to the fuel tank. An example timeline for detecting and mitigating liquid fuel carryover in the evap recovery lines is depicted in FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283 The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 34 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling.

Further, in some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, ELCM 295, and refueling lock 245. The control system 214 may include a controller 212. The controller may receive input data from the various sensors, process the input data, and trigger the actuators in response to the processed input data based on instruction or code programmed therein corresponding to one or more routines. An example control routine is described herein with reference to FIG. 3.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump configured to apply a negative pressure to the fuel system when in a first conformation, such as when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed. The ELCM vacuum pump may be a reversible vacuum pump, and thus configured to apply a positive pressure to the fuel system when a bridging circuit is reversed placing the pump in a second conformation.

The refueling system and evaporative emissions system may be configured to sequester fuel vapors during refueling events, and further configured to trigger the shutoff of a refueling pump when the fuel level in the fuel tank increases above a threshold. For example, a float valve may be coupled to FLVV 285, and configured to close the valve when the fuel level reaches a threshold level. This may thus prevent fuel vapor from entering vapor recovery line 231, building a pressure in the fuel tank which triggers the automatic shutoff of the refueling pump. However, refueling operators may choose to "trickle fill" the fuel tank following the automatic shutoff, incrementally adding fuel to the fuel tank. If too much additional fuel is added, fuel may enter and become trapped within vapor recovery line 231. During a canister purging event, which may occur at the first engine-on event following the refueling event, the trapped liquid fuel may be drawn into the fuel vapor canister, damaging the adsorbent. Recognizing and mitigating liquid fuel within the vapor recovery line may thus increase the life of the fuel vapor canister, thereby reducing emissions of the vehicle.

A flow chart for a high-level example method 300 for a refueling liquid fuel carryover detection and mitigation strategy is shown in FIG. 3. More specifically, method 300 may be used indicate the presence of fuel in an evap recovery line following a refueling event, and if fuel is detected, return the fuel to the fuel tank. Method 300 will be described with reference to the systems described herein and shown in FIGS. 1-2, though it should be understood that similar methods may be applied to other systems without departing from the scope of this disclosure. Method 300 may be carried out by a controller, such as controller 212 in FIG. 2, and may be stored at the controller as executable instructions in non-transitory memory. Briefly, method 300 includes, during a first condition, activating a vacuum pump to pressurize the fuel system responsive to a first fuel tank pressure decay rate being less than a threshold, and responsive to a second fuel tank pressure decay rate being greater than a threshold, maintaining the vacuum pump on until a fuel tank pressure decreases to atmospheric pressure.

Method 300 begins at 305 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 310, method 300 includes indicating whether a refueling event has been requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. If a refueling event has not been requested, the method 300 proceeds to 312, wherein method 300 includes maintaining the status of the fuel system, and may further include maintaining the status of the evaporative emissions system. For example, components such as the FTIV, CVV, CPV, ELCM, fuel pump, and refueling lock may be signaled by the controller to maintain their current conformation and/or activity. Method 300 may then end.

If a request for refueling is received, method 300 proceeds to 315. At 315, method 300 includes depressurizing the fuel tank. For example, the controller 212 may open a fuel tank isolation valve (such as FTIV 252) and opening or maintaining open a vent path between the fuel vapor canister and atmosphere (e.g., open CVV and/or ELCM changeover valve in a venting position), while maintaining a canister purge valve (e.g., CPV 261) closed, to depressurize the fuel tank before allowing enabling fuel to be added therein. The fuel tank isolation valve may be opened in a manner to depressurize the fuel tank at a predetermined rate, so as to prevent rapid depressurization which may cause damage to fuel system components (e.g., FLVV and GVV, which may cork shut due to rapid depressurization). A refueling lock, such as refueling lock 245, may be maintained locked until the fuel tank pressure decreases to a threshold pressure (e.g., atmospheric pressure), and then commanded to unlock, thus allowing access to the fuel filler neck only following fuel tank depressurization. The fuel tank isolation valve and canister vent path may be maintained open for the duration of the refueling event, to allow refueling vapors to be flowed to the fuel vapor canister, and to allow gasses stripped of refueling vapors to be flowed to atmosphere.

Continuing at 320, method 300 includes monitoring fuel level via a fuel tank fill level sensor and fuel tank pressure (FTP) via a fuel tank pressure sensor for the duration of the refueling event. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event. The end of the refueling event may be indicated based on one or more of the fuel tank pressure and fuel level. For example, the end of the refueling event may be indicated when a fuel level has plateaued for a duration, and when a fuel tank pressure has not increased over the plateau duration. In other examples, the end of the refueling event may be indicated responsive to a refueling nozzle being removed from the fuel filler neck. The fuel level and fuel tank pressure may continue to be monitored following the end of the refueling event, as described further herein.

Continuing at 325, method 300 includes monitoring the bleed-down rate of fuel tank pressure. For example, a pressure bleed-down rate may be monitored by an FTPT, such as FTPT 291 as shown in FIG. 2, and compared to a threshold bleed-down rate. The threshold bleed-down rate may comprise a rate that is expected if there is no fuel in the evap recovery line(s) or other obstructions hindering bleed-down to atmospheric pressure. The bleed-down rate may be further based on the fuel fill level, canister load, etc. If the monitored pressure bleed-down rate is greater to or equal to the threshold bleed-down rate, it may be indicated at the controller that the evap recovery line(s) are free from residual fuel or other obstruction. Method 300 then proceeds to 330, and includes sealing the fuel tank responsive to the fuel tank pressure decreasing to a threshold (e.g., atmospheric pressure), for example by commanding the FTIV closed. Method 300 then proceeds to 335, where vehicle operating conditions are updated based on the refueling event. For example a dashboard fuel gage, fuel level based parameters such as miles-to-empty, a canister loading state, and a canister purge schedule may be updated. Method 300 may then end.

If the pressure bleed-down rate is less than the threshold, method 300 proceeds to 340, where a vacuum pump, such as a pump included in ELCM 295 in FIG. 2, is activated in order to pressurize the evap system and fuel tank with atmospheric air. As the first fuel tank pressure decay rate following the refueling event is less than a threshold, it is indicated that liquid fuel carryover may be present in the one or more evap recovery lines. The fuel tank is maintained unsealed (e.g., the FTIV is maintained open). If the reduced pressure bleed-down rate is due to residual fuel in the evap recovery line(s), the pressure from the vacuum pump should return the fuel to the fuel tank and allow the fuel tank pressure to decay.

Continuing at 345, method 300 again includes monitoring fuel tank pressure for pressure bleed-down. If, after a predetermined time interval, the pressure bleed-down rate is below a threshold, method 300 proceeds to 350 where the vacuum pump is deactivated and it is indicated that there is a blockage or restriction in the evap system. Indicating a blockage or restriction in the evap system may include setting a diagnostic code or flag at the controller, and may further include illuminating a malfunction indicator lamp. Additional on-board tests may be scheduled to mitigate and/or determine the nature of the restriction. A blockage or restriction from residual fuel in the evap recovery lines is unlikely due to the fact that pressurization of the evap system and fuel tank failed to restore pressure bleed-down in the evap system. Thus, the indicated restriction may be due to canister aging or blockages, air filter clogging, stuck valves, etc. For example, an air filter may be clogged due to sand, salt, spiders, etc. entering the vent line thereby restricting stripped gasses from exiting the vent line and resulting in the evap system holding pressure after a refueling event. Method 300 then proceeds to 335, where vehicle operating conditions are updated according to the commenced refueling event, and canister purging at the next engine-on event may be suspended. Method 300 may then end.

Returning to 345, if, after a predetermined time interval, the second fuel tank pressure bleed-down rate greater than a threshold is observed, method 300 proceeds to 355 where the vacuum pump is maintained on for a duration until the measured fuel tank pressure decreases to atmospheric pressure. When fuel tank pressure reaches atmospheric pressure, it is indicated that no residual fuel exists in the evap line(s) and the vacuum pump is turned off. As such, method 300 proceeds to 360 where the fuel tank is sealed by commanding the FTIV closed.

Continuing at 365, method 300 includes determining whether the refueling event was terminated by an automatic shut-off event. An automatic shut-off event may be indicated by a controller, such as controller 212, and may be based on fuel tank fill level, fuel tank pressure, etc. For example, a fuel tank pressure above a threshold may trigger an automatic shutoff of the refueling pump. A float valve may be coupled to a fill limit vent valve, and configured to close the valve when the fuel level reaches a threshold. The closing of the FLVV may restrict fuel vapor from entering the evap recovery line, and may thus generate a threshold pressure within the fuel tank. Automatic shut-off events may also be triggered due to a restriction in the evap recovery lines, canister vent line, etc. A refueling event may include multiple automatic shutoff events. For example, a refueling nozzle that includes on-board vapor recovery may automatically shut off if the refueling nozzle is not coupled to the fuel filler neck properly. Further, if a refueling operator trickle fills the fuel tank following a first automatic shutoff event, an additional automatic shutoff event may occur.

If no automatic shutoff was detected, (refueling has ended as indicated by, for example, a stabilization of fuel level, removal of fuel nozzle from fuel neck, etc., method 300 may proceed to 370. At 370, method 300 includes indicating to perform one or more on-board tests to determine the integrity of the fuel system. As the vacuum pump cleared a restriction in the evap recovery lines, it may be inferred that the restriction was due to fuel in the evap recovery lines. As such, the restriction may have been due to overfilling due to a stuck open FLVV, a malfunctioning float valve, vapor recirculation line degradation, etc. The fuel tank fill level and fuel tank pressure during the refueling event may indicate or eliminate one or more of these possibilities, and appropriate degradation tests may be scheduled. Method 300 may then proceed to 335, where vehicle operating conditions are updated based on the refueling event as described. Method 300 may then end.

If an automatic-shutoff event has been detected, method 300 may proceed to 375. At 375, method 300 may include determining whether the automatic shut-off event was due to a full fuel tank. For example, method 300 may include determining whether the fuel level in the fuel tank was overfilled at the time of the automatic shutoff event. If the fuel level in the fuel tank is determined to be greater than or equal to 100% of fuel tank capacity at the time of the premature shutoff event, method 300 may proceed to 380. At 380, method 300 includes indicating to the vehicle operator that the fuel tank was overfilled, resulting in fuel entering the evap recovery line(s). For example, a message may be presented on a dashboard panel. If multiple automatic shut-off events were detected with a full fuel tank, method 300 may further include indicating to the vehicle operator to discontinue the practice of trickle-filling a fuel tank after automatic shutoff. Method 300 then proceeds to 335, where vehicle operating conditions are updated based on the refueling event as described. Method 300 may then end.

If the fuel tank was not indicated to be full at the time of an automatic shutoff event, method 300 proceeds to 385. At 385, method 300 includes indicating an on-board test to determine the integrity of the fuel level indicator. The monitored pressure and fuel level data may be analyzed to determine whether the FLI is degraded, and/or additional FLI degradation testing may be indicated. Other degradation testing, such as the tests described at 370, may also be indicated. Method 300 then proceeds to 335, where vehicle operating conditions are updated based on the refueling event as described. Method 300 may then end.

FIG. 4 shows an example timeline for an onboard Evap system refueling liquid carryover detection and mitigation strategy using methods described herein and with respect to FIG. 3, as applied to the systems described herein and with reference to FIGS. 1-2. Timeline 400 includes plot 405, indicating whether a refueling event is taking place over time. Timeline 400 further includes plot 410, indicating the open or closed status of a fuel tank isolation valve (e.g., FTIV 252) over time. Timeline 400 further includes plot 415, indicating fuel level in a fuel tank, measured by a fuel level sensor (e.g., fuel level sensor 234) over time. Timeline 400 further includes plot 420, indicating pressure in a fuel tank, measured by a fuel tank pressure transducer (FTPT), such as FTPT 291, over time. Line 425 indicates a threshold pressure corresponding to atmospheric pressure. Line 430 indicates a threshold fuel tank pressure decay rate expected if the evap recovery line is unrestricted. Timeline 400 further includes plot 435, indicating the flow rate of a liquid fuel from a fuel dispenser into a fuel tank over time. Timeline 400 further includes plot 440, indicating the on or off state of an ELCM pump over time. In this example, when the ELCM pump is on, the pump is activated in a pressurizing mode, wherein atmospheric air is pumped into the evaporative emissions system.

At time $t_0$ the vehicle is in an off-state. Further, at time $t_0$ a refueling event has not been requested, as indicated by plot 405, and thus the FTIV is closed, as indicated by plot 410, and there is a standing pressure in the fuel tank, as indicated by plot 420. The ELCM pump is off, as indicated by plot 440 and there is a static indicated level of fuel in the fuel tank, as indicated by plot 415. Accordingly, no fuel is being disbursed into the fuel tank, as indicated by plot 435.

At time $t_1$ a refueling event is requested, and thus the FTIV is opened such that the fuel tank may be depressurized prior to refueling. Between time $t_1$ and time $t_2$, the fuel tank pressure decays to atmospheric pressure, as represented by line 425. In some examples, the fuel cap may be unlocked after the fuel tank falls to atmospheric pressure.

At time $t_2$, refueling begins. The fuel dispenser in this example dispenses liquid fuel at a uniform rate, as shown by plot 435. Between time $t_2$ and time $t_3$, the amount of fuel in the tank increases accordingly, as shown by plot 415. As shown by plot 420, pressure in the fuel tank increases to a steady-state pressure while the fuel flow rate remains uniform.

At time $t_3$, the fuel tank reaches a predetermined maximum full fill level. Approaching the full fill level causes the fuel tank pressure to sharply increase (e.g., due to a float valve closing a fill limit vent valve). Accordingly, the rise in fuel tank pressure causes an automatic shut-off signal to be sent to the dispenser. Accordingly, the fuel dispenser is shut off as shown by plot 435, and fuel dispensing ceases. As such, between time $t_3$ and time $t_4$, fuel tank pressure is observed to decrease.

At time $t_4$, the dispenser operator attempts to trickle-fill additional fuel in the fuel tank, as shown by plot 435. Accordingly, fuel tank pressure increases, as shown by plot 420. While a small volume of fuel is added to the fuel tank the fuel level indicator is already indicating a full tank, and thus the FLI output does not markedly change. At time $t_5$ the rise in fuel tank pressure abruptly causes another automatic shut-off signal to be sent to the fuel dispenser. Accordingly, the fuel dispenser is shut off, fuel dispensing ceases, and the fuel tank pressure decreases.

At time $t_6$, the dispenser operator again attempts to trickle-fill additional fuel into the fuel tank. Accordingly, fuel tank pressure increases, and the rise in fuel tank pressure abruptly causes an automatic shut-off signal to be sent to the fuel dispenser. Accordingly, the fuel dispenser is shut off, fuel dispensing ceases, and fuel tank pressure again begins to decrease.

At time $t_7$, following the final trickle-fill attempt by the dispenser operator, the refueling event ends. Between time $t_7$ and time $t_8$, the pressure in the fuel tank, as shown by plot 420 decreases at a rate substantially less than a threshold rate, shown by line 430. The threshold rate may be a rate at which pressure in the fuel tank is expected to decline following a refueling event under circumstances in which the evap line(s) are free from obstruction. At time $t_8$, a fuel tank pressure for an unrestricted fuel system is expected to reach atmospheric pressure. As the actual pressure is substantially greater than atmospheric pressure at time $t_8$, it may be inferred that fuel has entered the evap recovery line(s) as a result of dispenser operator trickle-filling the fuel tank following an automatic shutoff event. As such, at time $t_8$ the ELCM pump is activated, as shown by plot 440. Additionally, the FTIV is maintained open so that the ELCM pump may pressurize the evap recovery lines and the fuel tank, thus returning any residual fuel in the evap recovery line(s) to the fuel tank.

Between time $t_8$ and time $t_9$, fuel tank pressure decreases while the ELCM pump is operating. At time $t_9$ the fuel tank pressure reaches atmospheric pressure. As such, it may be indicated that the evap line(s) are free from residual fuel or other obstruction. Accordingly, the ELCM pump is deactivated, and the FTIV is commanded closed. As the FTIV is closed, the fuel tank is thus isolated and pressure may again begin to build, indicated by plot 420.

In this way, liquid entering the evap recovery lines is quickly and accurately diagnosed, and mitigating actions are undertaken to return the liquid fuel to the fuel tank. As such, vapor canister degradation is avoided due to liquid fuel contacting the vapor canister adsorbent material. The technical effect of detecting liquid fuel in the evap recovery line using the method described herein is to enable rapid assessment of fuel carryover such that during a subsequent drive cycle a canister purging event does not result in liquid fuel getting sucked into the vapor canister, thus corrupting the activated carbon.

The systems described herein and with reference to FIGS. 1 and 2, along with the method described herein and with reference to FIG. 3 may enable one or more systems and one or more methods. In one example, a method for a fuel system is presented, comprising: during a first condition, activating a vacuum pump to pressurize the fuel system responsive to a first fuel tank pressure decay rate being less than a threshold, and responsive to a second fuel tank pressure decay rate being greater than a threshold, maintaining the vacuum pump on until a fuel tank pressure decreases to atmospheric pressure. In this example, or any other example, the first condition may additionally or alternatively include a fuel tank isolation valve in an open conformation. In any of the preceding examples, or any other example where the first condition includes a fuel tank isolation valve in an open conformation, the fuel tank isolation valve may additionally or alternatively be opened prior to a recently completed refueling event. In any of the preceding examples, or any other example the method may additionally or alternatively comprise responsive to a second fuel tank pressure decay rate being greater than a threshold, determining whether the recently completed refueling event included an automatic shutoff of a refueling dispenser, and responsive to determining that the recently completed refueling event did not include an automatic shutoff of a refueling dispenser, indicating to perform one or more on-board tests to determine the integrity of the fuel system. In any of the preceding examples, or any other example, the method may additionally or alternatively comprise: responsive to determining that the recently completed refueling event did include an automatic shutoff of a refueling dispenser, determining whether a fuel level indicator indicates that a fuel tank is full; and responsive to determining that the fuel level indicator indicates that the fuel tank is full, indicating that the fuel tank was overfilled. In any of the preceding examples, or any other example, the method may additionally or alternatively comprise indicating an on-board test to determine the integrity of the fuel level indicator responsive to determining that the fuel level indicator indicates that the fuel tank is not full. In any of the preceding examples, or any other example, the method may additionally or alternatively comprise deactivating the vacuum pump responsive to the second fuel tank pressure decay rate being less than the threshold, and indicating a restriction in an evaporative emissions system coupled to the fuel system. In any of the preceding examples, or any other example wherein a restriction is indicated in the evaporative emissions system, the method may additionally or alternatively comprise suspending a canister purge operation at a subsequent engine-on event responsive to indicating a restriction in an evaporative emissions system. The technical effect of implementing this method is a diagnosis of liquid fuel carryover into an evaporative emissions system. By applying a pressure to the evaporative emissions system, the liquid fuel carryover may be mitigated.

In another example, a method for a fuel system is presented, comprising: following a refueling event, monitoring a fuel tank pressure bleed-down rate, indicating the presence of liquid fuel in an evap recovery line responsive to a first fuel tank pressure bleed-down rate less than a threshold, and actively returning the liquid fuel in the evap recovery line to the fuel tank. In this example or any other example, actively returning the liquid fuel in the evap recovery line to the fuel tank may additionally or alternatively comprise maintaining a fuel tank isolation valve open, and activating an evaporative leak check module vacuum pump in a pressurizing mode. In any of the preceding examples, or any other example where an evaporative leak check module vacuum pump is activated in a pressurizing mode, the method may additionally or alternatively comprise maintaining the evaporative leak check module vacuum pump on in the pressurizing mode responsive to a second fuel tank pressure bleed-down rate greater than a threshold, and deactivating the evaporative leak check module vacuum pump responsive to a fuel tank pressure decreasing to atmospheric pressure. In any of the preceding examples, or any other example, the method may additionally or alternatively comprise closing the fuel tank isolation valve responsive to the fuel tank pressure decreasing to atmospheric pressure. In any of the preceding examples, or any other example where an evaporative leak check module vacuum pump is activated in a pressurizing mode, the method may additionally or alternatively comprise deactivating the evaporative leak check module vacuum pump responsive to the second fuel tank pressure bleed-down rate being less than a threshold, and indicating a restriction in the evap recovery line. In any of the preceding examples, or any other example wherein a restriction is indicated in the evap recovery line, the method may additionally or alternatively comprise responsive to indicating a restriction in the evap recovery line, suspending a canister purge operation at a subsequent engine-on event. In any of the preceding examples, or any other example, the refueling event may additionally or alternatively comprise one or more automatic shutoffs of a refueling dispenser. In any of the preceding examples, or any other example, the method may additionally or alternatively comprise monitoring a fuel tank pressure and a fuel tank fill level during the refueling event. In any of the preceding examples, or any other example, the method may additionally or alternatively comprise: responsive to the first fuel tank pressure bleed-down rate being greater than the threshold, sealing the fuel tank responsive to a fuel tank pressure decreasing to atmospheric pressure, and updating a canister purge schedule. The technical effect of implementing this method is a reduction in canister damage due to overfilling a fuel tank. In scenarios wherein liquid fuel is carried over into an evap recovery line, a subsequent purge event may draw the liquid fuel into the canister, damaging the adsorbent therein. By returning the liquid fuel to the fuel tank, the damage can be mitigated, and the life of the canister can be extended.

In yet another example, a fuel system is presented, comprising: a fuel tank coupled to a fuel vapor canister via one or more evap recovery lines; a fuel tank isolation valve coupled between the fuel tank and the fuel vapor canister; a fuel tank pressure sensor; a fuel tank fill level sensor; and a controller storing instructions in non-transitory memory, that when executed, cause the controller to: receive a request for a refueling event; open the fuel tank isolation valve; monitor a fuel tank pressure via the fuel tank pressure sensor and a fuel tank fill level via the fuel tank fill level sensor for the duration of the refueling event; indicate liquid fuel carryover into the one or more evap recovery lines responsive to a first fuel tank pressure decay rate following the refueling event being less than a threshold. In this example, or any other example, the fuel system may additionally or alternatively comprise an evaporative leak check module comprising a reversible vacuum pump coupled between the fuel vapor canister and atmosphere; and the controller may additionally or alternatively store instructions in non-transitory memory, that when executed, cause the controller to: activate the reversible vacuum pump to direct atmospheric air into the fuel system responsive to an indication of liquid fuel carryover into the one or more evap recovery lines, and maintain the reversible vacuum pump on responsive to a second fuel tank pressure decay rate being greater than a threshold. In any of the preceding examples, or any other examples, the controller may additionally or alternatively store instructions in non-transitory memory, that when executed, cause the controller to: indicate a restriction in the one or more evap recovery lines responsive to the second fuel tank pressure decay rate being less than the threshold. The technical effect of implementing this system is a reduction in vehicle emissions by preventing damage to a fuel vapor canister. In this way, the capacity of the fuel vapor canister may be maintained, and thus allow accurate models of canister loading and unloading which may then be used to determine optimal canister purging and fuel tank venting schedules.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
during a first condition, activating a vacuum pump to pressurize the fuel system responsive to a first fuel tank pressure decay rate being less than a threshold; and
responsive to a second fuel tank pressure decay rate being greater than the threshold, maintaining the vacuum pump on until a fuel tank pressure decreases to atmospheric pressure.

2. The method of claim 1, wherein the first condition includes a fuel tank isolation valve in an open conformation.

3. The method of claim 2, wherein the fuel tank isolation valve was opened prior to a recently completed refueling event.

4. The method of claim 3, further comprising:
responsive to the second fuel tank pressure decay rate being greater than the threshold, determining whether the recently completed refueling event included an automatic shutoff of a refueling dispenser; and
responsive to determining that the recently completed refueling event did not include an automatic shutoff of a refueling dispenser, indicating to perform one or more on-board tests to determine an integrity of the fuel system.

5. The method of claim 4, further comprising:
responsive to determining that the recently completed refueling event did include an automatic shutoff of a refueling dispenser, determining whether a fuel level indicator indicates that a fuel tank is full; and
responsive to determining that the fuel level indicator indicates that the fuel tank is full, indicating that the fuel tank was overfilled.

6. The method of claim 5, further comprising:
responsive to determining that the fuel level indicator indicates that the fuel tank is not full, indicating an on-board test to determine an integrity of the fuel level indicator.

7. The method of claim 1, further comprising:
responsive to the second fuel tank pressure decay rate being less than the threshold, deactivating the vacuum pump; and
indicating a restriction in an evaporative emissions system coupled to the fuel system.

8. The method of claim 7, further comprising:
responsive to indicating the restriction in the evaporative emissions system, suspending a canister purge operation at a subsequent engine-on event.

9. A method for a fuel system, comprising:
following a refueling event, monitoring a fuel tank pressure bleed-down rate;
indicating a presence of liquid fuel in an evap recovery line responsive to a first fuel tank pressure bleed-down rate less than a threshold;
actively returning the liquid fuel in the evap recovery line to a fuel tank; and
responsive to the first fuel tank pressure bleed-down rate being greater than the threshold, sealing the fuel tank responsive to a fuel tank pressure decreasing to atmospheric pressure, and updating a canister purge schedule.

10. The method of claim 9, wherein actively returning the liquid fuel in the evap recovery line to the fuel tank comprises:

maintaining a fuel tank isolation valve open; and
activating an evaporative leak check module vacuum pump in a pressurizing mode.

11. The method of claim 10, further comprising:
maintaining the evaporative leak check module vacuum pump on in the pressurizing mode responsive to a second fuel tank pressure bleed-down rate greater than the threshold; and
deactivating the evaporative leak check module vacuum pump responsive to the fuel tank pressure decreasing to atmospheric pressure.

12. The method of claim 11, further comprising:
closing the fuel tank isolation valve responsive to the fuel tank pressure decreasing to atmospheric pressure.

13. The method of claim 11, further comprising:
deactivating the evaporative leak check module vacuum pump responsive to the second fuel tank pressure bleed-down rate being less than the threshold; and
indicating a restriction in the evap recovery line.

14. The method of claim 13, further comprising:
responsive to indicating the restriction in the evap recovery line, suspending a canister purge operation at a subsequent engine-on event.

15. The method of claim 9, wherein the refueling event comprises one or more automatic shutoffs of a refueling dispenser.

16. The method of claim 9, further comprising:
monitoring the fuel tank pressure and a fuel tank fill level during the refueling event.

17. A fuel system, comprising:
a fuel tank coupled to a fuel vapor canister via one or more evap recovery lines;
a fuel tank isolation valve coupled between the fuel tank and the fuel vapor canister;
a fuel tank pressure sensor;
a fuel tank fill level sensor;
an evaporative leak check module comprising a reversible vacuum pump coupled between the fuel vapor canister and atmosphere; and
a controller storing instructions in non-transitory memory that, when executed, cause the controller to:
receive a request for a refueling event;
open the fuel tank isolation valve;
monitor a fuel tank pressure via the fuel tank pressure sensor and a fuel tank fill level via the fuel tank fill level sensor for a duration of the refueling event;
indicate liquid fuel carryover into the one or more evap recovery lines responsive to a first fuel tank pressure decay rate following the refueling event being less than a threshold; and
responsive to an indication of liquid fuel carryover into the one or more evap recovery lines, activate the reversible vacuum pump to direct atmospheric air into the fuel system.

18. The fuel system of claim 17, wherein the controller further stores instructions in non-transitory memory that, when executed, cause the controller to:
maintain the reversible vacuum pump on responsive to a second fuel tank pressure decay rate being greater than the threshold.

19. The fuel system of claim 18, wherein the controller further stores instructions in non-transitory memory that, when executed, cause the controller to:
indicate a restriction in the one or more evap recovery lines responsive to the second fuel tank pressure decay rate being less than the threshold.

* * * * *